(12) United States Patent
Quintana et al.

(10) Patent No.: US 12,299,915 B2
(45) Date of Patent: May 13, 2025

(54) X-RAY DIGITAL IMAGE CORRELATION

(71) Applicant: National Technology & Engineering Solutions of Sandia, LLC, Albuquerque, NM (US)

(72) Inventors: Enrico C. Quintana, Albuquerque, NM (US); Elizabeth M. C. Jones, Cedar Crest, NM (US); Daniel Peter Rohe, Albuquerque, NM (US); Bryan Lee Witt, Albuquerque, NM (US); Timothy J. Miller, Albuquerque, NM (US); Phillip L. Reu, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 456 days.

(21) Appl. No.: 17/666,723

(22) Filed: Feb. 8, 2022

(65) Prior Publication Data
US 2023/0252663 A1 Aug. 10, 2023

(51) Int. Cl.
*G06T 7/593* (2017.01)
*G03B 42/02* (2021.01)
(52) U.S. Cl.
CPC ............ *G06T 7/593* (2017.01); *G03B 42/026* (2013.01); *G06T 2207/10116* (2013.01)
(58) Field of Classification Search
CPC ... G01B 11/16; G01B 11/165; G01B 11/2513; G01B 11/24; G01N 2203/0647; G01N 3/068; G01N 2203/0652; G01N 2203/0641; G06T 2207/30208; G06T 7/593; G03B 42/026
See application file for complete search history.

(56) References Cited

PUBLICATIONS

James, Jeremy, et al. "High-Speed X-ray Stereo Digital Image Correlation for Fluid-Structure Interactions in a Shock Tube." AIAA Scitech 2020 Forum. 2020. (Year: 2020).*
Jones, E.M.C. et al., "X-Ray Stereo Digital Image Correlation," Exp Tech 44, 159-174 (2020). https://doi.org/10.1007/s40799-019-00339-7, pp. 159-174.

* cited by examiner

*Primary Examiner* — Raphael Schwartz
(74) *Attorney, Agent, or Firm* — Yee & Associates, P.C.; Gregory M. Doudnikoff (57) ABSTRACT

A method of X-ray digital image correlation is provided. The method comprises aligning cameras of an X-ray imaging system, wherein the X-ray imaging system comprises two X-ray sources pointed at a target area at a stereo angle and two corresponding X-ray detectors behind the target area. The X-ray imaging system is tuned to determine power levels of the X-ray sources that maximize image contrast and signal-to-noise ratio. The system is calibrated to determine intrinsic and extrinsic stereoscopic imaging parameters. A specimen with a random contrast pattern comprising an X-ray attenuating material is placed in the target area. Stereoscopic X-ray images are taken of the specimen and processed according to the power levels of the X-ray sources to maximize image contrast and signal-to-noise ratio and remove background objects. Kinematic quantities are determined according to changes in the contrast pattern over a number of successive images.

19 Claims, 9 Drawing Sheets

X-RAY DIGITAL IMAGE CORRELATION

STATEMENT OF GOVERNMENT INTEREST

This invention was made with United States Government support under Contract No. DE-NA0003525 between National Technology & Engineering Solutions of Sandia, LLC and the United States Department of Energy. The United States Government has certain rights in this invention.

BACKGROUND

1. Field

The disclosure relates generally to digital image correlation, and more specifically to digital image correlation using x-ray imaging.

2. Description of the Related Art

Digital Image Correlation (DIC) is a powerful, image-based diagnostic tool for measuring the shape, displacement and deformation of an object. A pattern on the surface of the specimen is imaged periodically while the specimen is subjected to some type of loading. The pattern consists of random light and dark features, and can be either the natural object surface, or can be applied using techniques such as incomplete layers of white and black spray paint. Using the principle of optical flow, DIC tracks the motion of the pattern through consecutive images. Two-dimensional DIC (2D-DIC) is the simplest category of DIC, in which a single camera is mounted perpendicular to a planar object. The displacement and deformation of the object are restricted to a plane perpendicular to the optical axis, and only in-plane displacements are measured. An extension of 2D-DIC is stereo-DIC (S-DIC), in which two cameras are mounted at a stereo angle viewing the same region of interest on the object. By using a priori knowledge of the geometry of the stereo-rig (obtained through the stereo-system calibration routine), S-DIC provides three-dimensional shape and deformation measurements of the surface of the object. Compared to 2D-DIC, S-DIC is generally preferred since it eliminates the planar restriction and perspective error for objects moving towards or away from the cameras.

Since the initial presentation of 2D-DIC in the early 1980s, DIC has matured significantly and is now a well-established diagnostic technique. The International Digital Image Correlation Society (iDICs) has even begun the process of standardizing DIC for simple applications, such as mechanical characterization of materials in a standard laboratory environment. As DIC becomes more common, however, researchers are pushing DIC into more complex test environments that add significant challenges to making precise and accurate DIC measurements. For example, in explosive or combustion research, the sample may be engulfed in flames or smoke and be visually occluded, making optical-based measurements difficult or impossible. Another formidable challenge involves index of refraction variations (either spatial or temporal) of the medium through which the object is imaged.

Therefore, it would be desirable to have a method and apparatus that take into account at least some of the issues discussed above, as well as other possible issues.

SUMMARY

An illustrative embodiment provides a method of X-ray digital image correlation. The method comprises aligning cameras of an X-ray imaging system, wherein the X-ray imaging system comprises two X-ray sources pointed at a target area at a stereo angle and two corresponding X-ray detectors behind the target area. The cameras form part of the X-ray detectors. The X-ray imaging system is tuned to determine power levels of the X-ray sources that maximize image contrast and signal-to-noise ratio. The X-ray imaging system is then calibrated to determine intrinsic and extrinsic stereoscopic imaging parameters of the X-ray imaging system. A specimen is placed in the target area after calibrating the X-ray imaging system, wherein a random contrast pattern comprising an X-ray attenuating material is deposited on the specimen. The X-ray imaging system takes a number of stereoscopic X-ray images of the specimen over a number of time steps. A computer system preprocesses the stereoscopic X-ray images according to the power levels of the X-ray sources to maximize image contrast and signal-to-noise ratio and remove background objects and determines from the stereoscopic X-ray images kinematic quantities of the specimen according to changes in the random contrast pattern deposited on the specimen over a number of successive stereoscopic X-ray images.

Another illustrative embodiment provides a method of X-ray digital image correlation. The method comprises tuning an X-ray imaging system, wherein the X-ray imaging system comprises two X-ray sources pointed at a target area at a stereo angle and two corresponding X-ray detectors behind the target area, and wherein tuning determines power levels of the X-ray sources that maximize image contrast and signal-to-noise ratio. The X-ray imaging system is calibrated, wherein calibration comprises: taking stereoscopic X-ray images of a dot-grid calibration target mounted on a motorized stage assembly as the stage assembly rotates, tilts, and translates the dot-grid calibration target throughout a defined calibration volume; preprocessing the X-ray images of the dot-grid calibration target to enhance image contrast and signal-to-noise ratio; replacing the dot-grid calibration target with a speckled calibration target on the stage assembly; taking stereoscopic X-ray images of a speckled calibration target as the stage assembly rotates, tilts, and translates the speckled calibration target throughout the defined calibration volume; preprocessing the X-ray images of the speckled calibration target to enhance image contrast and signal-to-noise ratio; and correlating the X-ray images of the speckled calibration target to determine intrinsic and extrinsic stereoscopic imaging parameters of the X-ray imaging system. A specimen is placed in the target area after calibrating the X-ray imaging system, wherein a random contrast pattern comprising an X-ray attenuating material is deposited on the specimen. The X-ray imaging system takes a number of stereoscopic X-ray images of the specimen over a number of time steps while concurrently applying at least one of motion, loading, or deformation to the specimen. A computer system preprocesses the stereoscopic X-ray images to maximize image contrast and signal-to-noise ratio and remove background objects according to the power levels of the X-ray sources. The computer system then determines from the stereoscopic X-ray images kinematic quantities of the specimen according to changes in the random contrast pattern deposited on the specimen over a number of successive stereoscopic X-ray images.

Another illustrative embodiment provides an X-ray digital image correlation system comprising an X-ray imaging system and a computer system. The X-ray imaging system comprises: two X-ray sources pointed at a target area at a stereo angle, wherein power levels of the X-ray sources are set to maximize image contrast and signal-to-noise ratio; and two corresponding X-ray detectors behind the target area, wherein each X-ray detector comprises a camera and a scintillator. The computer system is programmed to: tune the X-ray imaging system to determine power levels of the X-ray sources that maximize image contrast and signal-to-noise ratio; calibrate the X-ray imaging system to determine intrinsic and extrinsic stereoscopic imaging parameters of the X-ray imaging system; take a number of stereoscopic X-ray images of a specimen in the target area over a number of time steps, wherein a random contrast pattern comprises an X-ray attenuating material is deposited on the specimen; preprocess the stereoscopic X-ray images according to the power levels of the X-ray sources to maximize image contrast and signal-to-noise ratio and remove background objects; and determine, from the stereoscopic X-ray images, kinematic quantities of the specimen according to changes in the random contrast pattern deposited on the specimen over a number of successive stereoscopic X-ray images.

The features and functions can be achieved independently in various examples of the present disclosure or may be combined in yet other examples in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that complex test environments add significant challenges to making precise and accurate DIC measurements. For example, in explosive or combustion research, the sample may be engulfed in flames or smoke and be visually occluded, making optical-based measurements difficult or impossible.

The illustrative embodiments recognize and take into account that another formidable challenge involves index of refraction variations (either spatial or temporal) of the medium through which the object is imaged. This situation can occur in many different situations such as: (1) The object is heated, and temperature- and density-gradients develop in the air between the object and the camera; (2) The object is in an explosive environment and shock waves pass between the object and the camera; (3) The object is in a wind tunnel or shock tube and is imaged through a complex fluid flow. In all of these situations, visible light is refracted through density gradients in the medium(s) between the object and the camera, leading to beam-steering effects which manifest as false displacements and strains in DIC measurements.

The illustrative embodiments recognize and take into account that measurements using standard optical (visible-light) DIC can have significant errors or be completely infeasible in challenging environments, such as explosive, combustion, or fluid-structure interaction applications, where beam-steering due to index of refraction variation biases measurements or where the sample is occluded from line-of-sight or engulfed in flames or soot.

The illustrative embodiments provide a method utilizing X-ray imaging instead of visible light imaging for stereo-DIC (XS-DIC). Calibration of the system is performed using a target such as a printed circuit board with gold or copper pads, which is then moved over five degrees of freedom. A random contrast pattern comprising x-ray attenuating metal (e.g., tungsten or tantalum) is applied to a specimen. The specimen is then irradiated by two x-ray machines pointing at the specimen at a stereo angle. The system takes a number of successive x-ray images of the specimen as strain is applied to the specimen. The system processes the x-ray images through DIC algorithms. Because x-ray images are prone to lower contrast and to higher noise than optical imaging, the illustrative embodiments perform quantitative optimization of contrast and minimization of image noise based on x-ray machine parameters (i.e., voltage and current). The images are then preprocessed to maximize contrast and signal-to-noise ratio. Changes in the contrast pattern in successive x-ray images of the specimen are used to measure kinematic quantities such as displacement and strain of the specimen.

Figure 1:
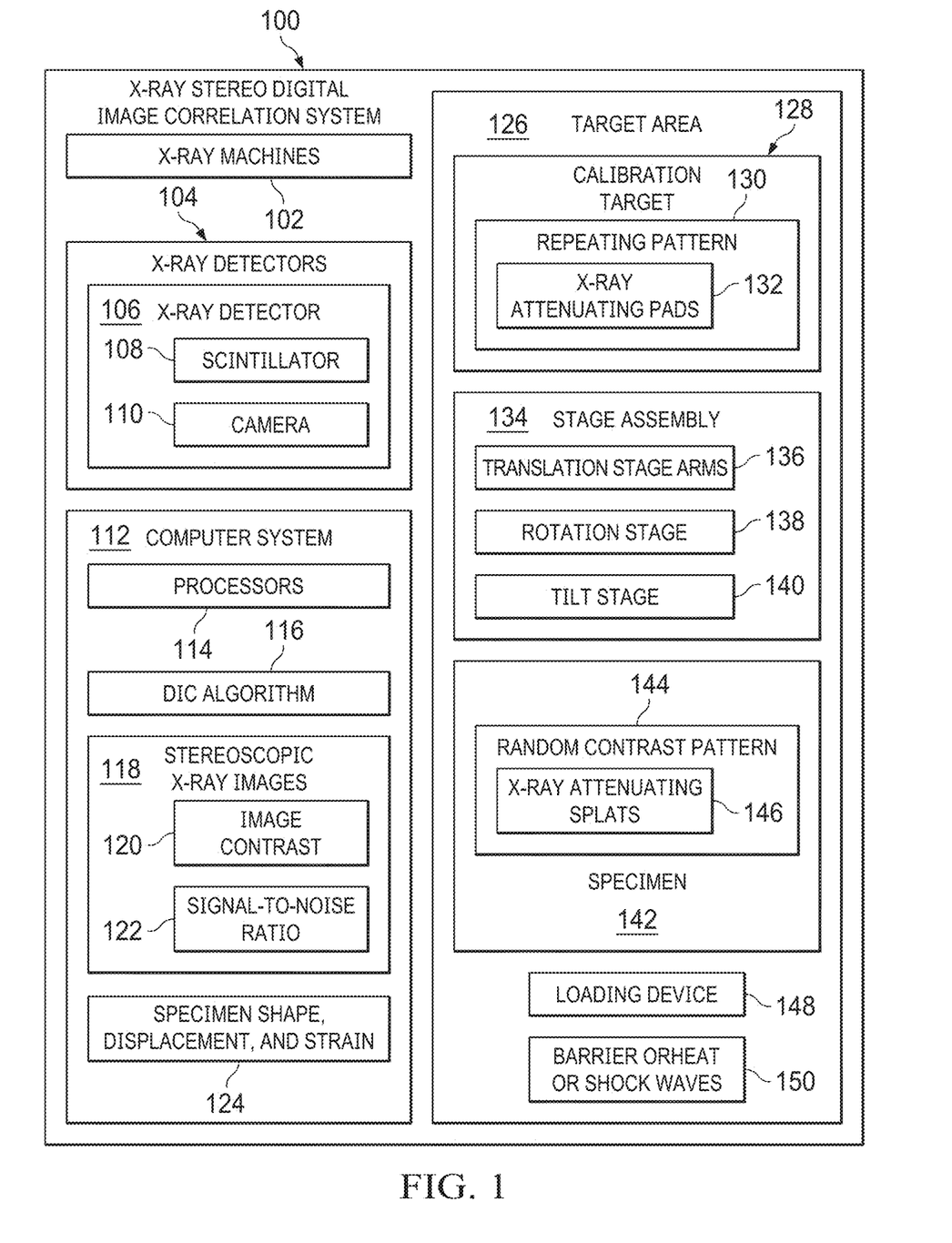
FIG. 1 depicts a block diagram illustrating an X-ray stereo digital image correlation system in accordance with an illustrative embodiment.

FIG. 1 depicts a block diagram illustrating an x-ray stereo digital image correlation (XS-DIC) system in accordance with an illustrative embodiment. XS-DIC system 100 comprises a number of x-ray machines 102 that are pointed at target area 126. Corresponding x-ray detectors 104 are located behind target area 126. Each x-ray detector 106 comprises a scintillator 108 and camera 110.

To calibrate XS-DIC system 100, calibration target 128 may be placed in target area 126. Calibration target 128 may comprise a printed circuit board on which is etched a repeating pattern 130 (e.g., 9×9 dot-grid array) comprising x-ray attenuating pads 132. X-ray attenuating pads 132 may be made of a metal such as gold or copper.

Calibration target may be held by a motorized stage assembly 134. Stage assembly 134 comprises a number of translation stage arms 136, rotation (yaw) stage 138, and tilt (pitch) stage 140, which together can move calibration target 128 through five degrees of freedom, allowing XS-DIC system 100 to image the calibration target 128 in a variety of positions.

After calibration, a specimen 142 is placed in target area in place of calibration target 128. Specimen 142 comprises a random contrast pattern 144, which comprises x-ray attenuating splats 146 deposited on the surface of specimen 142. The x-ray attenuating splats 146 may contain a metal such as titanium or tantalum to improve image contrast during x-ray imaging of specimen 142.

A loading device 148 may be configured to apply motion, mechanical loading, thermal loading, or deformation to specimen 142 during X-ray imaging, allowing XS-DIC system 100 to capture kinematic quantities such as shape, displacement, or strain in specimen 142 as shown by changes in random contrast pattern 144 over a number of successive stereoscopic X-ray images 118.

Depending on testing conditions, target area 126 may include a barrier and/or heat or shock waves 150 resulting from heat or air disturbances produced by wind (such as in a wind tunnel), detonations, explosions, or combustion. Target area 126 might comprise a shock tube, wind tunnel, radiant heater, or fire environment.

Computer system 112 controls XS-DIC system 100. Computer system 112 uses a number of processors 114 to run DIC algorithm 116. Computer system 100 receives stereoscopic x-ray images 118 of either calibration target 126 or specimen 142 from x-ray detectors 104. Stereoscopic x-ray images 118 comprise qualities including image contrast 120 and signal-to-noise ratio 122. Applying DIC algorithm 116 to stereoscopic x-ray images 118, computer system 112 can determine the kinematic quantities such as shape/displacement/strain 124 of specimen 142.

DIC is a well-established, non-contact diagnostic technique used to measure kinematic quantities such as shape, displacement, strain, and strain-rate on the surface of a solid specimen subjected to motion, loading or deformation. Two-dimensional DIC (2D-DIC) employs a single camera perpendicular to a planar test piece and provides 2D displacements and strains. Stereo-DIC (S-DIC) employs two cameras viewing the test piece at a stereo-angle and provides 3D displacements and 2D strains on the surface of a test piece of potentially complex geometry. Measurements using standard optical (visible-light) DIC can have significant errors or be completely infeasible in challenging environments, such as explosive, combustion, or fluid-structure interaction applications, where beam-steering due to index of refraction variation biases measurements or where the sample is occluded from line-of-sight or engulfed in flames or soot. To address these challenges, we have developed a method to utilize X-ray imaging instead of visible light imaging for stereo-DIC (XS-DIC), since refraction of X-rays is negligible in many situations, and X-rays can penetrate occluding material.

Volumetric-DIC, also called Digital Volume Correlation (DVC), is another related diagnostic that is also based on X-ray imaging. However, there are several key differences that distinguish our proposed XS-DIC from DVC. First, DVC provides measurements throughout the entire volume of the object, while XS-DIC provides measurements only on the surface (or multiple surfaces) of the object that is patterned. Second, DVC requires a pattern throughout the entire volume of the object, while XS-DIC requires a pattern only on a measurement surface. For homogeneous specimens, creating a pattern for DVC requires an invasive alteration of the object, e.g., the addition of particles of a dense material to a less dense polymer, which typically results in radically different material properties. Therefore, the test object for DVC is typically restricted to naturally heterogeneous composites or porous materials, and sub-optimal natural patterns or patterns that degrade during deformation can lead to decorrelation and/or measurement errors. Applying a pattern on a single surface for XS-DIC, though, is less invasive, and thus XS-DIC is applicable to homogeneous objects. Third, DVC is applicable only to quasi-static tests where loading is applied in isolated steps, since some form of time-intensive volumetric imaging of the object is required at each load step (e.g., collection of a series of 2D images at varying rotational angles around the object for tomographic imaging). In contrast, XS-DIC can be used in dynamic tests, since only a pair of X-ray images is required for each instance in time.

In order to accurately track displacements, and thus deformation, in three dimensions using a stereo imaging system, both the intrinsic and extrinsic properties of the stereo measurement system must be known. Extrinsic properties include the geometric relationship between the two imaging systems (e.g., three translations and three rotations that map the location of one system with respect to the other), and intrinsic properties include the camera sensors center and skew, effective lens focal lengths, and distortion parameters. These parameters have a different physical interpretation for an X-ray imaging system compared to an optical system. Determining these properties is typically done with a target grid pattern, where the size and spacing of features is precisely known. These targets typically include special fiducial markers that aid in image registration during the calibration process.

A new calibration target was developed for X-ray stereo DIC, which was similar in function but different in form than the target used for optical DIC. In optical DIC, different manufacturing processes are used to create a target, but the most common method is to print the grid of features onto a solid background using ink or paint. This method provides contrast of black features on a white background (or vice versa) when imaged with visible light. For X-ray DIC, traditional circuit board etching methods were utilized, where gold or copper pads were placed in a formation like the optical grid pattern, including the orientation fiducials. The denser pads attenuate more X-rays than the surrounding less-dense composite material, creating contrast between dark features on a light background. This calibration target is then moved around the entire calibration volume in five degrees of freedom (all three translations, pitch, and yaw) using a motorized platform. An automated process was developed that allows the user to set stage positions, trigger to initiate X-rays and image capture, extract images directly from the stereo cameras' memory, and perform basic image processing steps, easily providing a user specified number of calibration images, typically ranging between tens to hundreds of images. In addition to measuring the intrinsic and extrinsic properties of the stereo X-ray imaging system, studies were performed to understand their differences compared to typical optical calibration properties, most of which were driven by the necessary inclusion of the scintillator plates that introduce shift/skew/distortion artifacts. Other calibration target methods have been explored and can be used including mounting steel spheres onto a machined plexiglass surface.

DIC relies on a random contrast pattern on the surface of the test object to facilitate subset correlation and tracking. In optical DIC, these contrast patterns are commonly black speckles on a white background and may be painted on the object. Similar to the calibration target, this method does not provide any contrast for X-ray imaging. Several methods of patterning samples were explored and are feasible for X-ray DIC. These include embedding a high-density powder (e.g., tungsten or tantalum) in paint as a binding agent and applying via a mask. Masks have been created using consumer vinyl cutting machines, additive manufacturing (3D printers), as well as machined out of material stock. Another speckling method utilized was done via different spray methods. In this case, tantalum particles are accelerated at high speeds, either at room temperature or elevated temperatures, through a mask, where they adhere to the test piece surface via mechanical interlocking of the individual splats to create speckles.

Processing X-ray images through DIC algorithms presents different challenges than optical images. Each step in the X-ray imaging process comes with continual loss of energy, i.e., the images ultimately acquired are photon starved. Unlike optical imaging, image intensity cannot be boosted with external light sources. Additionally, enhancing contrast between the pattern features and the background material requires the addition of more high-density patterning material; however, the pattern must remain unobtrusive and not affect the properties (e.g., mechanical, thermal, etc.) of the test piece, which places a practical limit on the amount of patterning material that can be utilized and thus the resulting image contrast. Together, these considerations result in X-ray images with higher noise and lower contrast than typical for optical images, which stresses the standard DIC algorithms. Development of X-ray DIC required quantitative optimization of contrast and minimization of image noise based on X-ray machine parameters (i.e., voltage and current). These images are then preprocessed to maximize image contrast and signal-to-noise ratio.

Figure 2:
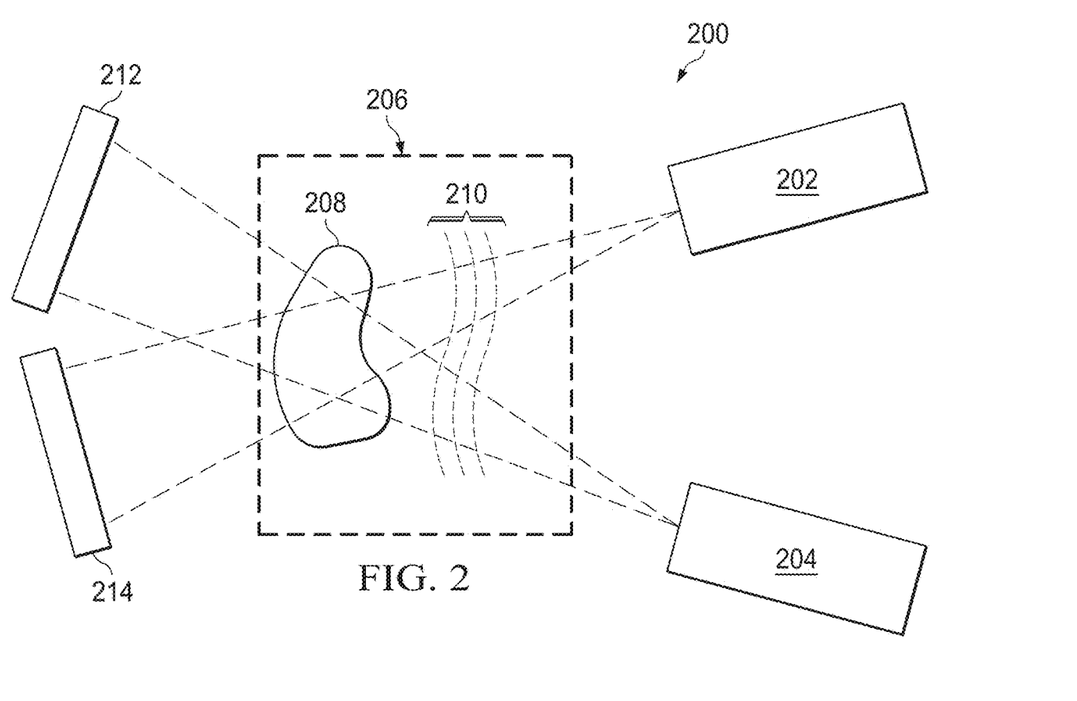
FIG. 2 depicts a diagram illustrating a stereoscopic X-ray imaging system in accordance with an illustrative embodiment.

FIG. 2 depicts a diagram illustrating a stereoscopic X-ray imaging system in accordance with an illustrative embodiment. X-ray imaging system 200 may be an example implementation of XS-DIC system 100 shown in FIG. 1.

X-ray imaging system 200 comprises two X-ray machines 202, 204 pointed at target area 206 at a stereo angle. Two corresponding X-ray detectors 212, 214 are located behind target area 206.

A target 208 is placed inside target area 206. Target 208 might comprise a calibration target or a test specimen. An obscuring barrier 210 might also be present in target area 206, located between X-ray machines 202, 204 and target 208. Barrier 210 might comprise, e.g., an outer structure within which target 208 is contained. As another example, barrier 210 might also comprise heat or shock waves that create an air density gradient within target area 206.

Figure 3:
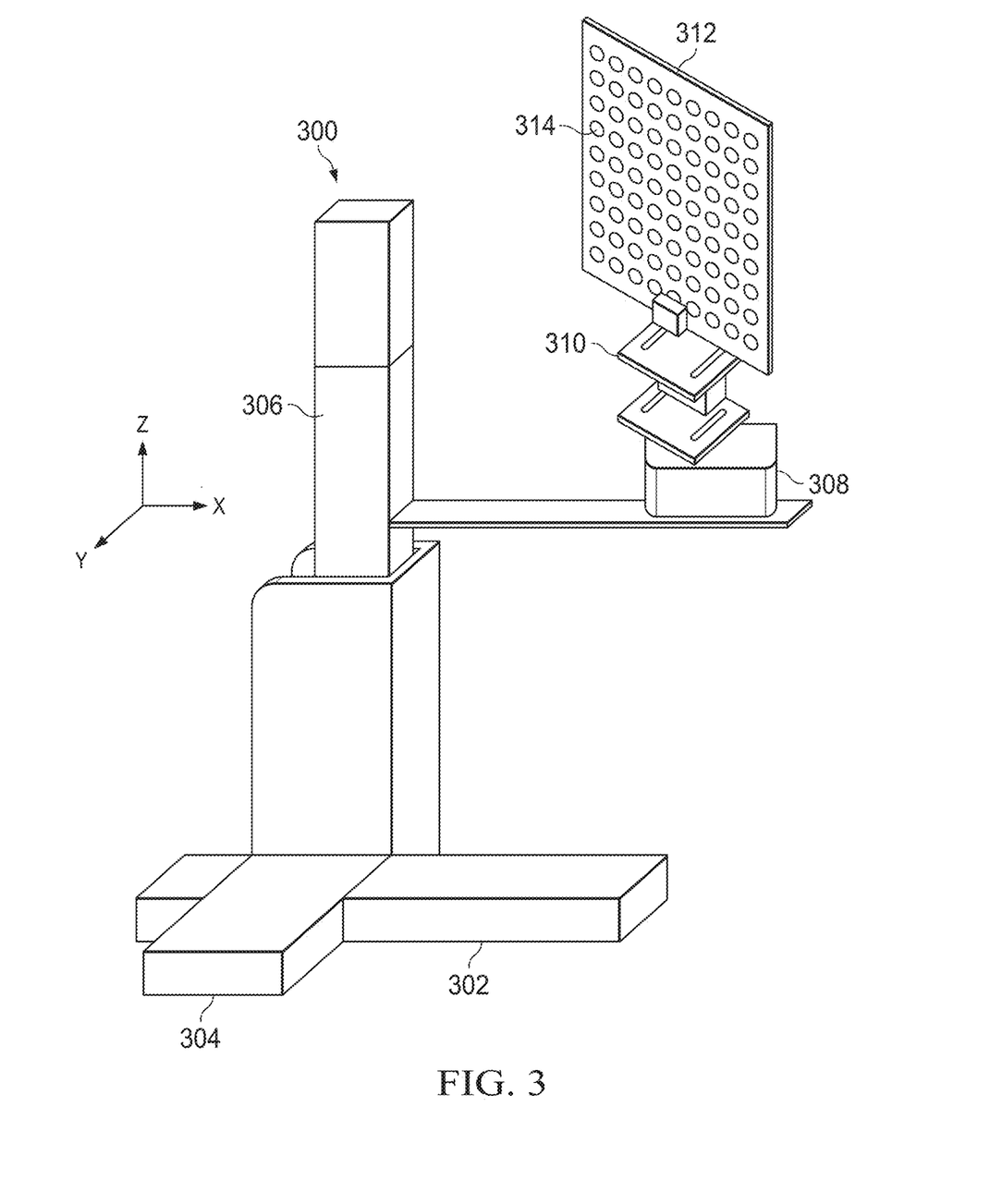
FIG. 3 depicts an example of a motorized stage assembly holding a calibration target in accordance with an illustrative embodiment.

FIG. 3 depicts an example of a motorized stage assembly holding a calibration target in accordance with an illustrative embodiment. Stage assembly 300 comprises translation arms 302, 304, 306, which might be examples of translation stage arms 136 in FIG. 1. Translation arms 302, 304, 306, allow the calibration target 312 to be moved along the x, y, and z axes, respectively, within a calibration volume. Mounted to stage assembly 300 is rotation stage 308 and tilt stage 310, which holds the calibration target 312.

Dot-grid calibration target 312 is an example of calibration target 122 in FIG. 1. The 9×9 pattern of X-ray attenuating pads 314 may be an example of repeating pattern 124.

Figure 4:
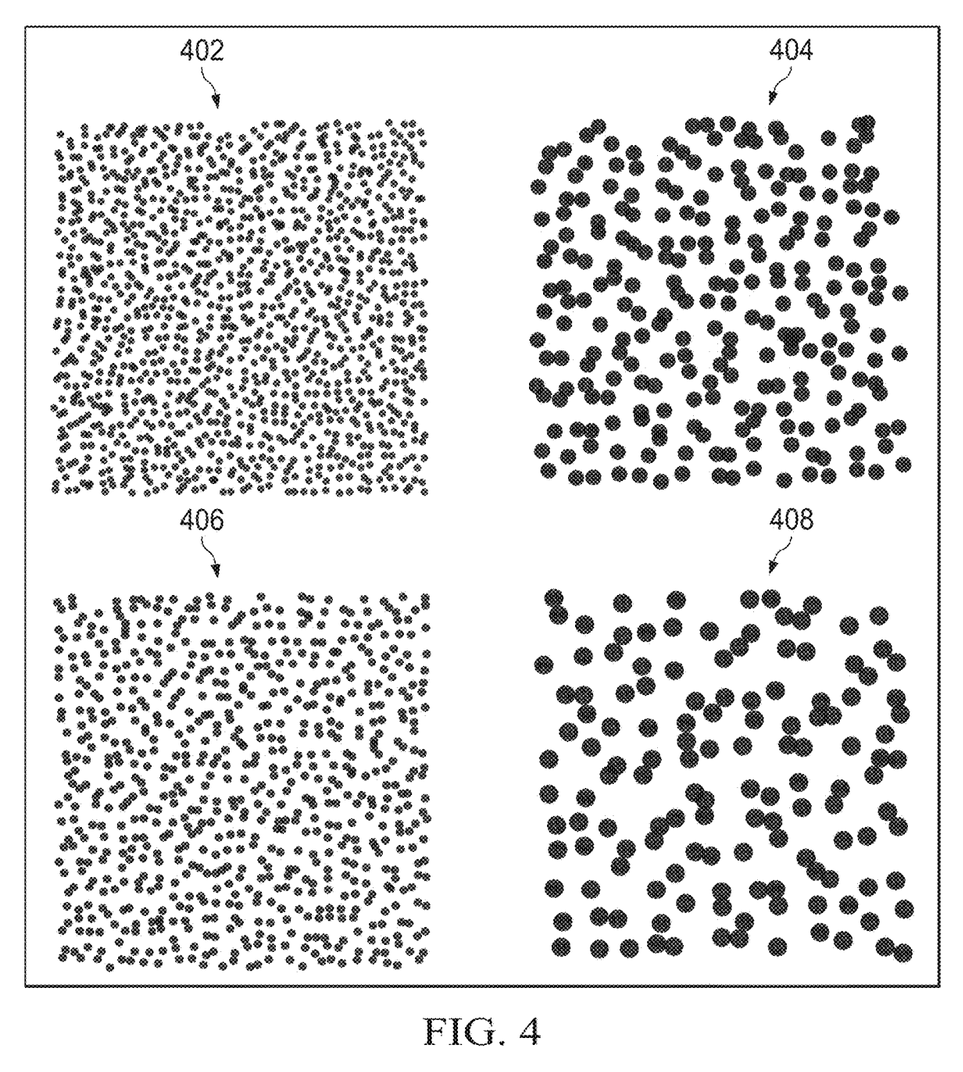
FIG. 4 depicts a number of example random X-ray attenuating splat patterns in accordance with illustrative embodiments.

FIG. 4 depicts a number of example random X-ray attenuating splat patterns in accordance with illustrative embodiments. Random (speckle) contrast patterns 402-408 may be examples of random contrast pattern 136 on specimen 134 in FIG. 1.

Figure 5:
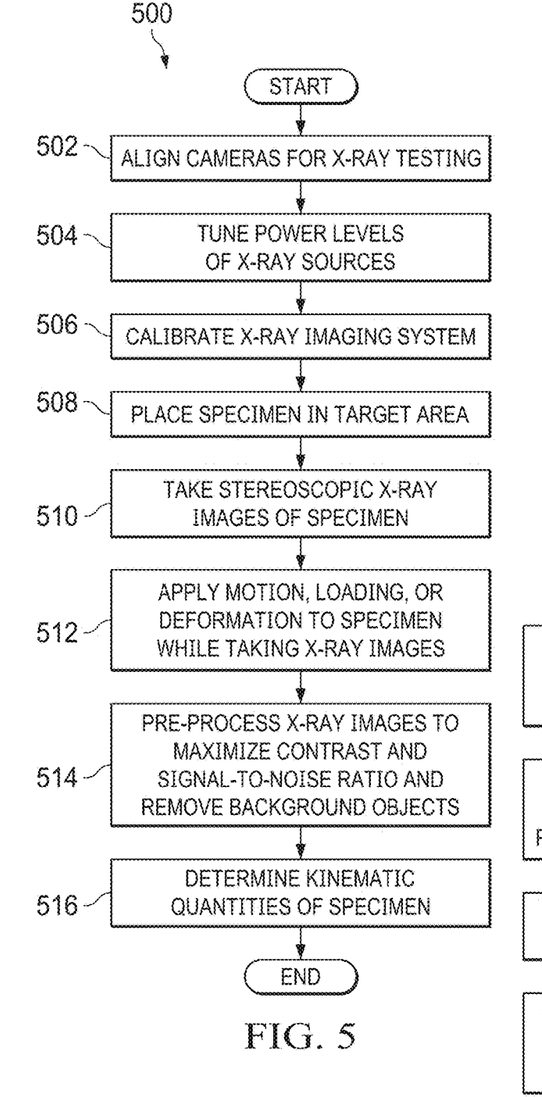
FIG. 5 depicts a flowchart illustrating a method of X-ray digital image correlation in accordance with an illustrative embodiment.

FIG. 5 depicts a flowchart illustrating a method of X-ray digital image correlation in accordance with an illustrative embodiment. Process 500 may be implemented using XS-DIC system 100 and X-ray imaging system 200.

Process 500 begins by aligning cameras for X-ray testing (step 502). The X-ray imaging system comprises two X-ray sources pointed at a target area at a stereo angle and two corresponding X-ray detectors behind the target area. The target area may comprise, e.g., a shock tube or wind tunnel.

After alignment, the X-ray imaging system is tuned to determine power levels of the X-ray sources that maximize image contrast and signal-to-noise ratio (step 504). Next, the X-ray imaging system is calibrated to determine intrinsic and extrinsic stereoscopic imaging parameters of the X-ray imaging system (step 506).

After calibration, a specimen is placed in the target area after calibrating the X-ray imaging system (step 508). A random contrast pattern comprising an X-ray attenuating material is deposited on the specimen. For example, the random contrast pattern deposited on the specimen may comprise titanium or tantalum as the X-ray attenuating material.

The X-ray imaging system takes a number of stereoscopic X-ray images of the specimen over a number of time steps (step 510). At least one of motion, loading, or deformation may be applied to the specimen concurrently with taking the X-ray images (step 512).

A computer system preprocesses the stereoscopic X-ray images according to the power levels of the X-ray sources to maximize image contrast and signal-to-noise ratio and remove background objects (step 514). The computer system then determines from the stereoscopic X-ray images kinematic quantities such as shape, displacement, strain, and strain rate of the specimen according to contrast pattern deposited on the specimen (step 516). Process 500 then ends.

Figure 6:
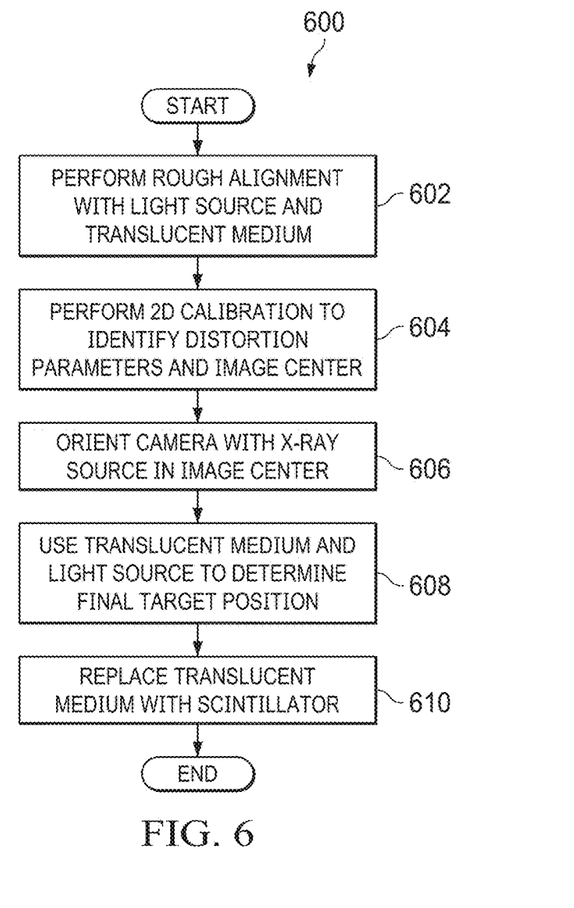
FIG. 6 depicts a flowchart illustrating a method of camera alignment in accordance with an illustrative embodiment.

FIG. 6 depicts a flowchart illustrating a method of camera alignment in accordance with an illustrative embodiment. Process 600 is a detailed example of step 502 in FIG. 5. Process 600 is performed for both X-ray detectors. Process 600 takes into account that camera alignment cannot be performed while the X-ray source is running.

Process 600 begins by performing initial rough alignment with a light source which is co-located with the X-ray source and a translucent medium (e.g., thin paper) positioned between the light source and camera, wherein the translucent medium is used in place of the scintillator that will ultimately be used to collect X-ray images. A target located between the light source and translucent medium casts an image onto the translucent medium that is detected by the camera, allowing the user to position equipment to achieve the desired field of view (step 602).

Next, the translucent medium is removed, and a two-dimensional calibration is performed on the camera using a standard optical calibration target to identify distortion parameters and image center (step 604). The camera is then oriented such that the X-ray source is aligned at the image center (step 606).

The translucent medium is again placed between the light source and camera. The visible light image on the translucent medium can be used to determine the exact target position resulting in the desired position and magnification on the translucent medium (and thus ultimately on the scintillator) (step 608). The translucent medium is finally replaced with a scintillator, wherein the scintillator panel is flat and positioned perpendicular to the camera optical axis (step 610). Process 600 then ends.

Figure 7:
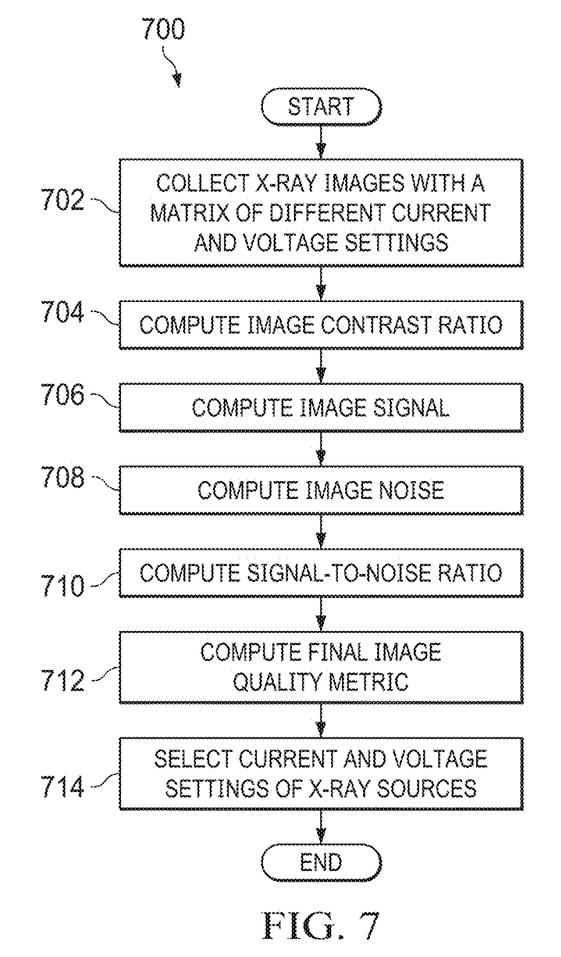
FIG. 7 depicts a flowchart illustrating a method of tuning the X-ray imaging system to determine power levels of the X-ray sources in accordance with an illustrative embodiment.

FIG. 7 depicts a flowchart illustrating a method of tuning the X-ray imaging system to determine power levels of the X-ray sources in accordance with an illustrative embodiment. Process 700 is a detailed example of step 504 in FIG. 5. X-ray sources have variable power settings. More power does not necessarily result in better X-ray images. The optimal power setting differs for different targets/specimens. Voltage determines how "penetrating" the X-rays are. Current determines how many X-ray photons are emitted. The X-ray power is the product of voltage and current. Power determines how much heat is generated, which limits run time. Process 700 determines power settings for the X-ray sources that maximize image contrast in terms of grey counts while also maximizing signal-to-noise ratio. The mean and standard deviation are calculated for all grey values under the curve corresponding to bright (background) and dark (dot/speckle) pixels. The contrast ratio is defined as the ratio between background (bright) and dot/speckle (dark) mean grey values. Signal-to-noise ratio (SNR) is defined as the mean/standard deviation of the bright grey values. Final image quality metric=(contrast ratio−1)*SNR.

Optimal power settings for the X-ray sources will also depend on whether static or dynamic testing is being performed. Whereas static tests can be performed in milliseconds, dynamic tests might require several seconds of run time, which limits the available current.

Process 700 begins by collecting a number of X-ray images with a matrix of different current and voltages settings (step 702). Next, process 700 computes the image contrast ratio for each X-ray image, defined as the ratio between the bright (background) and dark (dot/speckle) mean grey intensity values (step 704).

Process 700 computes the image signal of each X-ray image, defined as the mean of the bright grey values (step 706). Process 700 calculated the image noise of each X-ray image, defined as the standard deviation of the bright pixels (step 708). From the image signal and image noise, process 700 then calculates the signal-to-noise ratio (SNR) of each X-ray image, defined as the mean/standard deviation of the bright grey values (step 710).

Process 700 then calculates a final image quality metric for each X-ray image, defined as (contrast ratio−1)*SNR (step 712). According to the final image quality metrics of the X-ray images, process 700 selects the current and voltage settings for the X-ray sources that maximize the image quality metric (step 714). Process 700 then ends.

Figure 8:
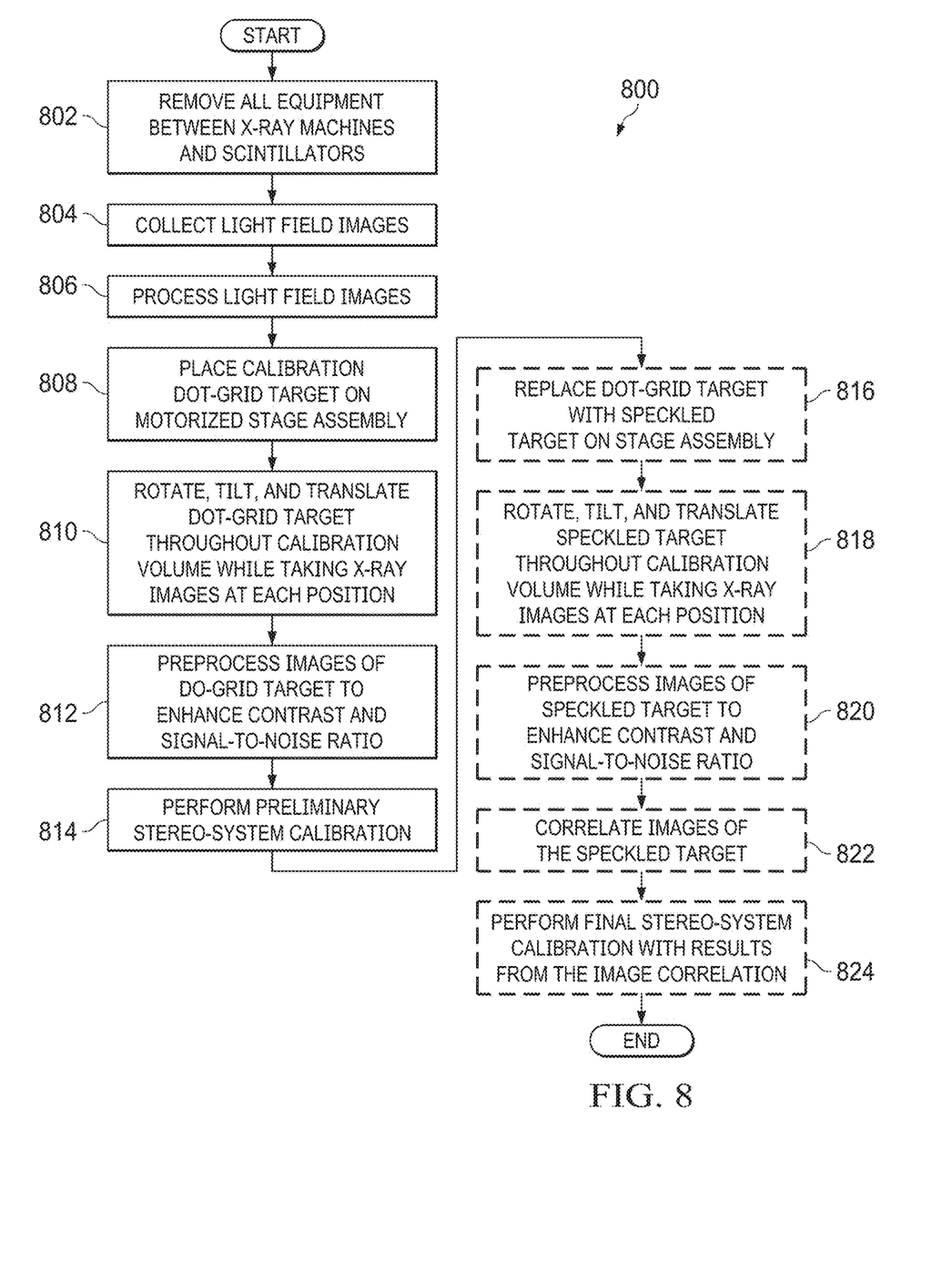
FIG. 8 depicts a flowchart illustrating a method of calibrating an X-ray imaging system in accordance with an illustrative embodiment.

FIG. 8 depicts a flowchart illustrating a method of calibrating an X-ray imaging system in accordance with an illustrative embodiment. Process 800 is a detailed example of step 506 in FIG. 5.

Process 800 begins by removing all equipment between the X-ray machines and scintillators of the X-ray detectors (step 802). Light field images are collected, which account for artifacts present on the cameras and scintillator surfaces within the X-ray detectors, as well as non-uniform X-ray illumination (step 804). The light-field images are then processed by taking an N-frame average (e.g., 4-frame average) and removing outlier pixels (step 806). The outlier pixels may be removed by applying an M-pixel outlier filter.

Next, a dot-grid calibration target is placed on the motorized stage assembly, wherein the dot grid comprises a repeating pattern of X-ray attenuating material (step 808). The dot-grid calibration target may be an example of calibration target 128 in FIG. 1. The stage assembly rotates, tilts, and translates the dot-grid calibration target throughout a defined calibration volume while stereoscopic X-ray images of the dot-grid calibration target are taken concurrently at each position of the stage assembly (step 810).

The X-ray images of the dot-grid calibration target are preprocessed to enhance image contrast and signal-to-noise ratio (step 812). The preprocessing might comprise taking an N-frame average, removing outlier pixels, correcting the X-ray images of the dot-gird calibration target with light-field images, and re-ranging the histogram. Re-ranging linearly scales pixel intensities such that dark dots are at 10% of maximum image intensity, and light background is at 90% of maximum image intensity.

A preliminary stereo-system calibration is performed to determine preliminary values for extrinsic and intrinsic parameters (step 814). Extrinsic properties include the geometric relationship between the two imaging systems (e.g., three translations and three rotations that map the location of one system with respect to the other), and intrinsic properties include the camera sensors center and skew, effective lens focal lengths, and distortion parameters. These parameters have a different physical interpretation for an X-ray imaging system compared to an optical system.

Optionally, the dot-grid calibration target is replaced with a speckled calibration target on the stage assembly (step 816). The speckled calibration target might comprise a flat plate with a random DIC speckle pattern created on it with X-ray attenuating material. The speckled calibration target is rotated, tilted, and translated throughout the calibration volume by the stage assembly while stereoscopic X-ray images of the speckled calibration target are taken at each position, similar to the dot-grid calibration target (step 818).

The X-ray images of the speckled calibration target are preprocessed to enhance contrast and signal-to-noise ratio (step 820). Preprocessing the speckled calibration target X-ray images may comprise taking an N-frame average, removing outlier pixels, and correcting the X-ray images of the speckled calibration target with the light-field images. In the case of the speckled calibration target, histogram re-ranging is not applied.

The X-ray images of the speckled calibration target are correlated using the preliminary stereo-system calibration parameters (step 822). Images of the right imaging system are correlated to images of the left imaging system, and images of the translated/rotated images are correlated to the image at the beginning of the sequence of the plate in the original position.

A final stereo-system calibration is then performed using the results of the X-ray image correlation of the speckled calibration target and the dot-grid calibration target combined to determine the intrinsic and extrinsic stereoscopic imaging parameters (step 824). Process 800 then ends.

Figure 9:
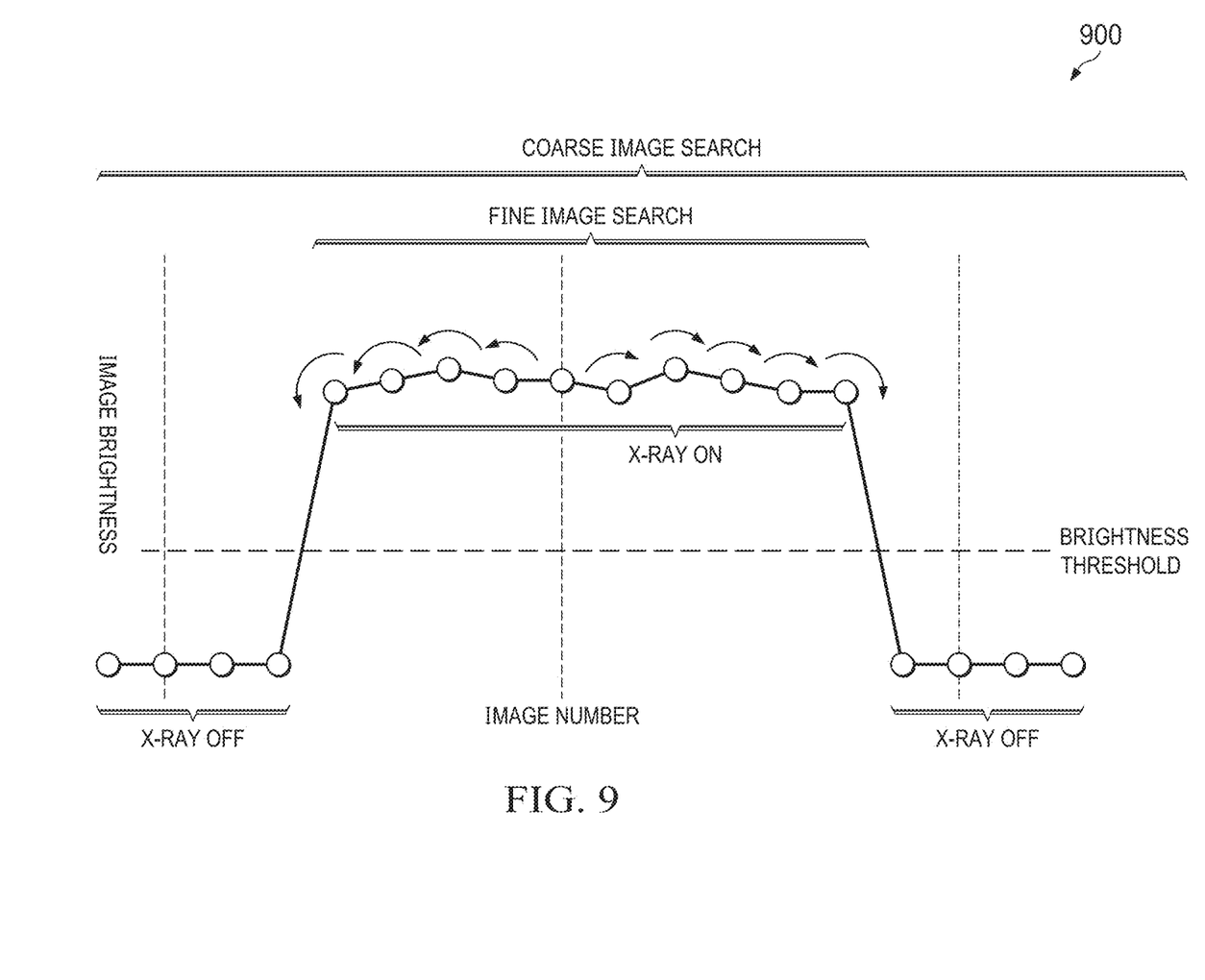
FIG. 9 depicts a diagram illustrating a process for automatic calibration image acquisition in accordance with an illustrative embodiment.

FIG. 9 depicts a diagram illustrating a process for automatic calibration image acquisition in accordance with an illustrative embodiment. Process 900 may be applied to images collected during calibration process 800 in FIG. 8, depending on the type of camera system employed. Specifically, process 900 may be applied to high-speed camera used for dynamic testing. During the calibration procedure, large numbers of images are taken. However, only a small percentage of those images correspond to times when the X-ray sources are on. Because X-ray startup time is uncertain, bright images must be found among many dark images. Manual identification of the bright images where the X-rays sources were on is very time consuming and not practicable.

To avoid downloading all images from the camera, process 900 first performs course image search to identify where bright images are. Average image brightness above a specified threshold is used to identify images where the X-ray sources are on.

When a bright image above the threshold is detected, process 900 then switches from course search to fine image search and steps through the X-ray images one by one until the brightness is no longer above the threshold. All "on" X-ray images found during fine image search are averaged together into a single averaged X-ray image to reduce image noise, and this single averaged X-ray image is saved.

Process 900 has the advantage of only downloading a small subset of all captured images and removes the need for user interaction of downloading and exporting images manually. No human interaction is required to identify where the "on" images are.

Figure 10:
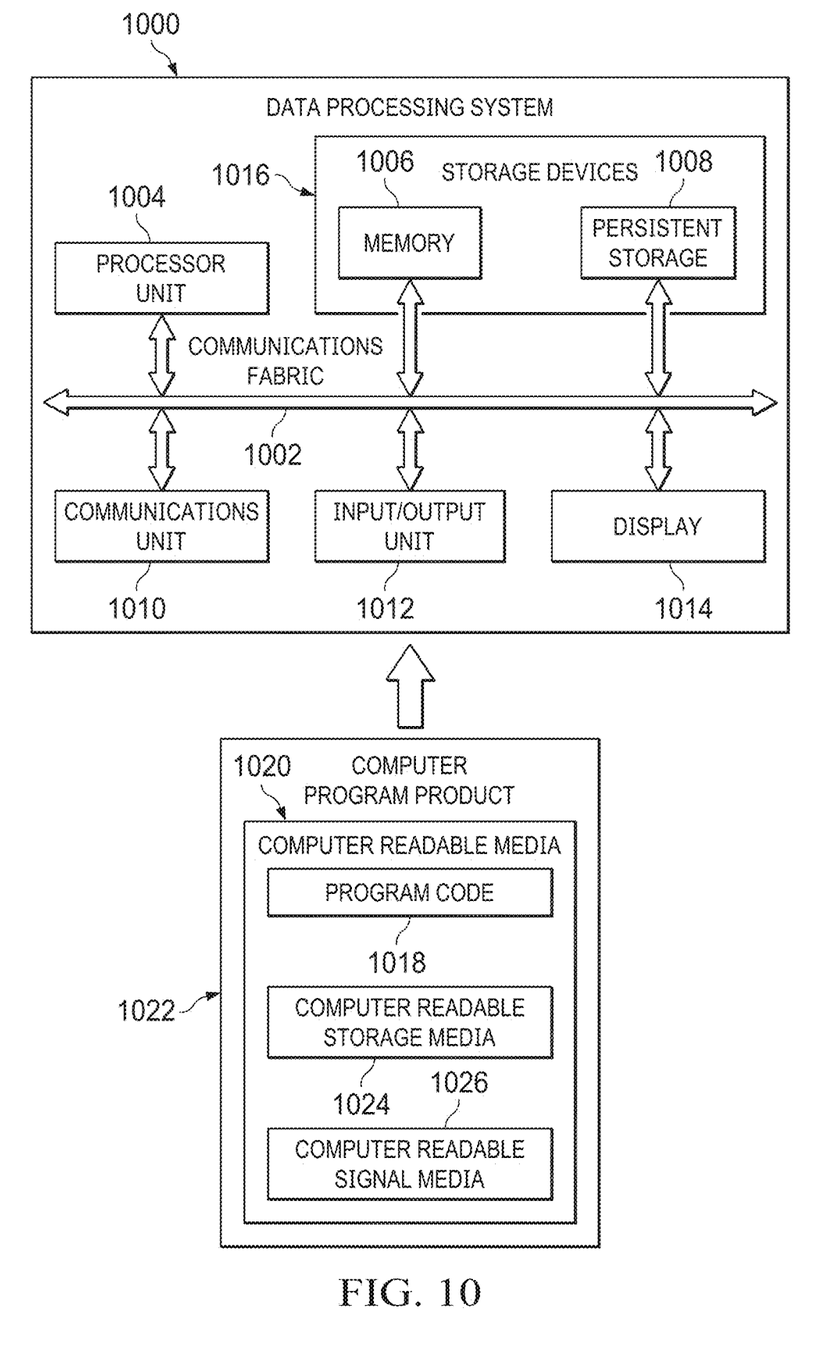
FIG. 10 is a diagram of a data processing system depicted in accordance with an illustrative embodiment.

Turning now to FIG. 10, an illustration of a block diagram of a data processing system is depicted in accordance with an illustrative embodiment. Data processing system 1000 may be used to implement computer system 112 shown in FIG. 1. In this illustrative example, data processing system 1000 includes communications framework 1002, which provides communications between processor unit 1004, memory 1006, persistent storage 1008, communications unit 1010, input/output unit 1012, and display 1014. In this example, communications framework 1002 may take the form of a bus system.

Processor unit 1004 serves to execute instructions for software that may be loaded into memory 1006. Processor unit 1004 may be a number of processors, a multi-processor core, or some other type of processor, depending on the particular implementation. In an embodiment, processor unit 1004 comprises one or more conventional general-purpose central processing units (CPUs). In an alternate embodiment, processor unit 1004 comprises one or more graphical processing units (GPUs).

Memory 1006 and persistent storage 1008 are examples of storage devices 1016. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1016 may also be referred to as computer-readable storage devices in these illustrative examples. Memory 1016, in these examples, may be, for example, a random access memory or any other suitable volatile or non-volatile storage device. Persistent storage 1008 may take various forms, depending on the particular implementation.

For example, persistent storage 1008 may contain one or more components or devices. For example, persistent storage 1008 may be a hard drive, a flash memory, a rewritable optical disk, a rewritable magnetic tape, or some combination of the above. The media used by persistent storage 1008 also may be removable. For example, a removable hard drive may be used for persistent storage 1008. Communications unit 1010, in these illustrative examples, provides for communications with other data processing systems or devices. In these illustrative examples, communications unit 1010 is a network interface card.

Input/output unit 1012 allows for input and output of data with other devices that may be connected to data processing system 1000. For example, input/output unit 1012 may provide a connection for user input through at least one of a keyboard, a mouse, or some other suitable input device. Further, input/output unit 1012 may send output to a printer. Display 1014 provides a mechanism to display information to a user.

Instructions for at least one of the operating system, applications, or programs may be located in storage devices 1016, which are in communication with processor unit 1004 through communications framework 1002. The processes of the different embodiments may be performed by processor unit 1004 using computer-implemented instructions, which may be located in a memory, such as memory 1006.

These instructions are referred to as program code, computer-usable program code, or computer-readable program code that may be read and executed by a processor in processor unit 1004. The program code in the different embodiments may be embodied on different physical or computer-readable storage media, such as memory 1006 or persistent storage 1008.

Program code 1018 is located in a functional form on computer-readable media 1020 that is selectively removable and may be loaded onto or transferred to data processing system 1000 for execution by processor unit 1004. Program code 1018 and computer-readable media 1020 form computer program product 1022 in these illustrative examples. In one example, computer-readable media 1020 may be computer-readable storage media 1024 or computer-readable signal media 1026.

In these illustrative examples, computer-readable storage media 1024 is a physical or tangible storage device used to store program code 1018 rather than a medium that propagates or transmits program code 1018. Computer readable storage media 1024, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program code 1018 may be transferred to data processing system 1000 using computer-readable signal media 1026. Computer-readable signal media 1026 may be, for example, a propagated data signal containing program code 1018. For example, computer-readable signal media 1026 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1000 are not meant to provide architectural limitations to the manner in which different embodiments may be implemented. The different illustrative embodiments may be implemented in a data processing system including components in addition to or in place of those illustrated for data processing system 1000. Other components shown in FIG. 10 can be varied from the illustrative examples shown. The different embodiments may be implemented using any hardware device or system capable of running program code 1018.

As used herein, the phrase "a number" means one or more. The phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item C. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of X-ray digital image correlation, the method comprising: aligning cameras of an X-ray imaging system, by
    performing an initial alignment with a light source co-located with an X-ray source and a translucent medium positioned between the light source and a camera of the plurality of cameras, wherein the translucent medium is used in place of a scintillator that will ultimately be used to collect X-ray images;
    removing the translucent medium;
    performing two-dimensional calibration on the camera to identify distortion parameters and image center;
    orienting the camera such that the X-ray source is aligned at the image center;
    placing the translucent medium back between the light source and the camera;
    determining an exact target position; and
    replacing the translucent medium with a scintillator panel, wherein the scintillator panel is flat and positioned perpendicular to a camera optical axis, wherein the X-ray imaging system comprises two X-ray sources pointed at a target area at a stereo angle and two corresponding X-ray detectors behind the target area, wherein the cameras form part of the X-ray detectors;
    tuning the X-ray imaging system to determine power levels of the X-ray sources that maximize image contrast and signal-to-noise ratio;
    calibrating the X-ray imaging system to determine intrinsic and extrinsic stereoscopic imaging parameters of the X-ray imaging system;
    placing a specimen in the target area after calibrating the X-ray imaging system, wherein a random contrast pattern comprising an X-ray attenuating material is deposited on the specimen;
    taking, with the X-ray imaging system, a number of stereoscopic X-ray images of the specimen over a number of time steps;
    preprocessing, by a computer system according to the power levels of the X-ray sources, the stereoscopic X-ray images to maximize image contrast and signal-to-noise ratio and remove background objects; and
    determining, by the computer system, from the stereoscopic X-ray images, kinematic quantities of the specimen according to changes in the random contrast pattern deposited on the specimen over a number of successive stereoscopic X-ray images.

2. The method of claim 1, further comprising applying at least one of motion, loading, or deformation to the specimen concurrently with taking the X-ray images.

3. The method of claim 1, wherein the kinematic quantities comprise at least one of:
    shape;
    displacement;
    strain; or
    strain-rate.

4. The method of claim 1, wherein the target area comprises one of:
    a shock tube;
    a wind tunnel;
    a radiant heater; or
    a fire environment.

5. The method of claim 1, wherein the random contrast pattern deposited on the specimen comprises titanium or tantalum as the X-ray attenuating material.

6. The method of claim 1, wherein tuning the X-ray sources comprises:
    collecting a number of X-ray images with a matrix of different current and voltages settings;
    computing an image contrast ratio for each X-ray image;
    computing an image signal of each X-ray image;
    computing an image noise of each X-ray image;
    computing a signal-to-noise ratio of each X-ray image;
    computing a final image quality metric for each X-ray image; and
    selecting current and voltage settings for the X-ray sources according to the final image quality metrics of the X-ray images.

7. The method of claim 1, wherein calibrating the X-ray imaging system comprises
    collecting light-field images that account for artifacts present on the cameras and scintillator surfaces in the X-ray detectors as well as non-uniform X-ray illumination;
    taking an N-frame average of the light-field images;
    removing outlier pixels according to an M-pixel outlier filter;
    placing a dot-grid calibration target on a stage assembly, wherein a dot grid comprises a repeating pattern of X-ray attenuating material, and wherein the stage assembly rotates, tilts, and translates the dot-grid calibration target throughout a defined calibration volume;

concurrently taking stereoscopic X-ray images of the dot-grid calibration target at each position of the stage assembly;

preprocessing the X-ray images of the dot-grid calibration target to enhance image contrast and signal-to-noise ratio; and performing a preliminary stereo-system calibration to determine preliminary extrinsic and intrinsic parameters of the X-ray imaging system.

8. The method of claim 7, wherein the dot-grid calibration target comprises a printed circuit board, and wherein X-ray attenuating pads are made of gold or copper.

9. The method of claim 7, wherein preprocessing the X-ray images of the dot-grid calibration target comprises:

taking an N-frame average;

removing outlier pixels; and re-ranging a histogram of the images, wherein pixel intensities are scaled such that dark dots are at 10% of maximum image intensity and light background is at 90% of maximum image intensity.

10. The method of claim 7, further comprising:

replacing the dot-grid calibration target with a speckled calibration target on the stage assembly, wherein the stage assembly rotates, tilts, and translates the speckled calibration target throughout the defined calibration volume;

concurrently taking stereoscopic X-ray images of the speckled calibration target at each position of the stage assembly;

preprocessing the X-ray images of the speckled calibration target to enhance image contrast and signal-to-noise ratio;

correlating the X-ray images of the speckled calibration target according to the preliminary stereo-system calibration; and performing a final stereo-system calibration according to results of the X-ray image correlation of the speckled calibration target and the dot-grid calibration target combined to determine the intrinsic and extrinsic stereoscopic imaging parameters.

11. The method of claim 10, wherein speckled calibration target comprises a flat plate with a random digital image correlation speckle pattern formed of X-ray attenuating material.

12. The method of claim 10, wherein preprocessing the X-ray images of the speckled calibration target comprises:

taking an N-frame average;

removing outlier pixels; and correcting the X-ray images of the speckled calibration target with the light-field images.

13. The method of claim 1, further comprising automatically selecting a subset of X-ray images from all X-ray images taken by the X-ray imaging system by:

determining an average image brightness of the X-ray images;

performing course image search of the X-ray images;

upon detection of average image brightness above a specified threshold, switching from course image search to fine image search, wherein the X-ray images are stepped through one by one until a brightness of the X-ray images is no longer above the specified threshold;

averaging all X-ray images found during fine image search into a single averaged X-ray image; and saving the averaged X-ray image.

14. A method of X-ray digital image correlation, the method comprising:

tuning an X-ray imaging system, wherein the X-ray imaging system comprises two X-ray sources pointed at a target area at a stereo angle and two corresponding X-ray detectors behind the target area, and wherein tuning determines power levels of the X-ray sources that maximize image contrast and signal-to-noise ratio;

calibrating the X-ray imaging system, wherein calibration comprises:

taking stereoscopic X-ray images of a dot-grid calibration target mounted on a motorized stage assembly as the stage assembly rotates, tilts, and translates the dot-grid calibration target throughout a defined calibration volume;

preprocessing the stereoscopic X-ray images of the dot-grid calibration target to enhance image contrast and signal-to-noise ratio;

replacing the dot-grid calibration target with a speckled calibration target on the stage assembly;

taking stereoscopic X-ray images of a speckled calibration target as the stage assembly rotates, tilts, and translates the speckled calibration target throughout the defined calibration volume;

preprocessing the stereoscopic X-ray images of the speckled calibration target to enhance image contrast and signal-to-noise ratio; and correlating the stereoscopic X-ray images of the speckled calibration target to determine intrinsic and extrinsic stereoscopic imaging parameters of the X-ray imaging system;

placing a specimen in the target area after calibrating the X-ray imaging system, wherein a random contrast pattern comprising an X-ray attenuating material is deposited on the specimen; taking, with the X-ray imaging system, a number of stereoscopic X-ray images of the specimen over a number of time steps;

applying at least one of motion, loading, or deformation to the specimen concurrently with taking the stereoscopic X-ray images;

preprocessing, by a computer system according to power levels of the X-ray sources, the stereoscopic X-ray images to maximize image contrast and signal-to-noise ratio and remove background objects; and determining, by the computer system, from the stereoscopic X-ray images, kinematic quantities of the specimen according to changes in the random contrast pattern deposited on the specimen over a number of successive stereoscopic X-ray images.

15. An X-ray digital image correlation system, comprising:

an X-ray imaging system comprising:

two X-ray sources pointed at a target area at a stereo angle, wherein power levels of the X-ray sources are set to maximize image contrast and signal-to-noise ratio; and two corresponding X-ray detectors behind the target area, wherein each X-ray detector comprises a camera and a scintillator;

a computer system programmed to:

tune the X-ray imaging system to determine power levels of the X-ray sources that maximize image contrast and signal-to-noise ratio;

calibrate the X-ray imaging system to determine intrinsic and extrinsic stereoscopic imaging parameters of the X-ray imaging system;

take a number of stereoscopic X-ray images of a specimen in the target area over a number of time steps, wherein a random contrast pattern comprises an X-ray attenuating material is deposited on the specimen;

preprocess the stereoscopic X-ray images according to the power levels of the X-ray sources to maximize image contrast and signal-to-noise ratio and remove background objects;

determine, from the stereoscopic X-ray images, kinematic quantities of the specimen according to changes in the random contrast pattern deposited on the specimen over a number of successive stereoscopic X-ray images and system by:

select a subset of X-ray images from all X-ray images taken by the X-ray imaging determining an average image brightness of the X-ray images;

performing course image search of the X-ray images;

upon detection of average image brightness above a specified threshold, switching from course image search to fine image search, wherein the X-ray images are stepped through one by one until a brightness of the X-ray images is no longer above the specified threshold;

averaging all X-ray images found during fine image search into a single averaged X-ray image; and saving the averaged X-ray image.

16. The X-ray digital image correlation system of claim 15, further comprising a loading device configured to apply motion, loading, or deformation to the specimen during X-ray imaging.

17. The X-ray digital image correlation system of claim 15, wherein the kinematic quantities comprise at least one of:

shape;

displacement;

strain; or strain-rate.

18. The X-ray digital image correlation system of claim 15, wherein the target area comprises one of:

a shock tube;

a wind tunnel;

a radiant heater; or a fire environment.

19. The X-ray digital image correlation system of claim 15, wherein the random contrast pattern deposited on the specimen comprises titanium or tantalum as the X-ray attenuating material.

* * * * *